April 7, 1942.  A. A. BLUEMLE  2,278,579
MASTER BRAKE CYLINDER AND SWITCH UNIT
Filed March 8, 1940
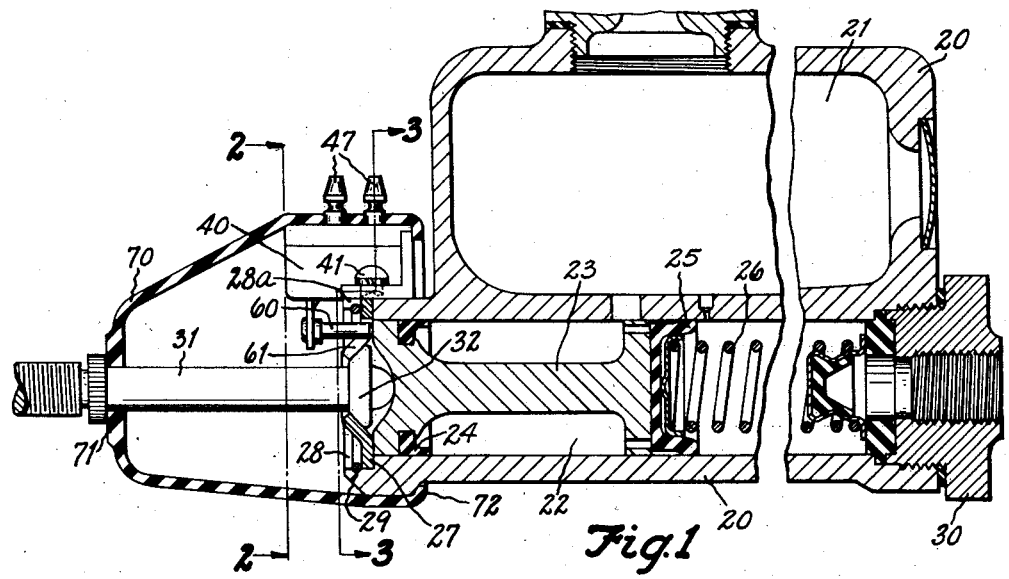
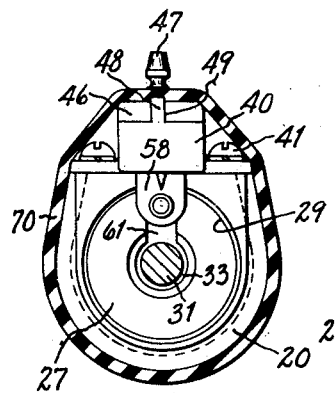
Fig.2
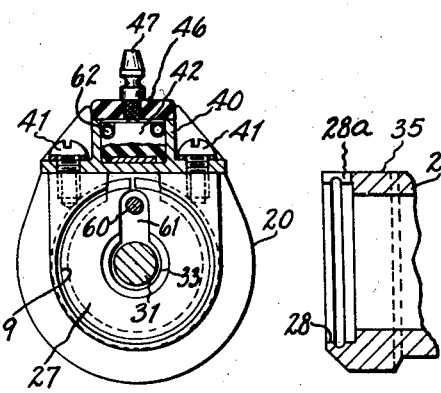
Fig.3
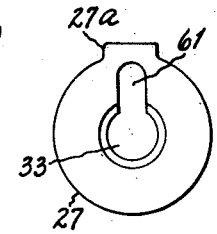
Fig.4 Fig.5
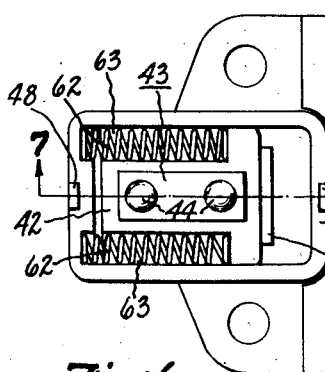
Fig.6
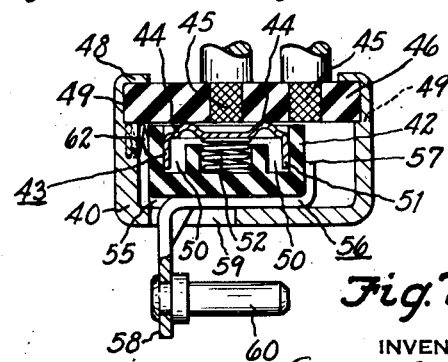
Fig.7
INVENTOR
Arnold A. Bluemle
BY
Spencer Hardman & Fehr
his ATTORNEYS Patented Apr. 7, 1942

2,278,579

UNITED STATES PATENT OFFICE 2,278,579

MASTER BRAKE CYLINDER AND SWITCH UNIT

Arnold A. Bluemle, Anderson, Ind., assignor to General Motors Corporation, Detroit, Mich., a corporation of Delaware Application March 8, 1940, Serial No. 322,959

2 Claims. (Cl. 200—52)

This invention relates to stop light switches for use in automotive vehicle lighting systems in order to indicate to the driver in the car behind that the brakes in the car ahead are being applied. Heretofore it has been the practice to use in connection with hydraulic braking systems an oil pressure switch for completing the circuit between the current source and the stop light signal mounted on the rear end of the automobile. As these stop light switches are relatively expensive and are not very durable, I have sought to provide an electric switch other than a hydraulic switch which I can apply to the braking system in an economical manner. Therefore, it is an object of the present invention to provide a switch of simple and economical construction which may be combined with the matter brake cylinder of a hydraulic braking system.

Further objects and advantages of the present invention will be apparent from the following description, reference being had to the accompanying drawing wherein a preferred embodiment of the present invention is clearly shown.

In the drawing:

Fig. 1 is longitudinal sectional view of a master brake cylinder combined with an electric switch according to my present invention.

Fig. 2 is a sectional view on lines 2—2 of Fig. 1.

Fig. 3 is a sectional view on lines 3—3 of Fig. 1.

Fig. 4 is a sectional view on the left end portion of the casting which provides the master brake cylinder.

Fig. 5 is a plan view of a washer which is received by the part shown in Fig. 4.

Fig. 6 is a top plan view of the switch with the cover removed and is drawn to twice the scale of the other Figs.

Fig. 7 is a sectional view on line 7—7 of Fig. 6.

Referring to Fig. 1, 20 designates a casting or housing providing a reservoir 21 for receiving hydraulic brake fluid and providing a cylinder 22 within which slides a piston 23 provided with rubber or neoprene piston members 24 and 25. The piston 23 is urged toward the left by spring 26 into engagement with a washer 27 which is retained within a counterbore 28 of part 20 by wire split ring 29. The normal or non-braking position of the piston 23 is shown in Fig. 1, there being brake fluid between piston 25 and an end member or plug 30. To apply the brakes the piston 23 is moved toward the right by a rod 31 attached to any suitable brake pedal, not shown. Rod 31 has a head 32 confined between the piston 23 and the washer 27 when the piston is in the normal position. The central opening 33 in the washer 27, see Fig. 5, guides the rod 31.

The exterior upper portion of the casting 20 is provided with a flat or plane surface 35 upon which is mounted the frame or housing 40 of a stop light switch. Said frame being secured by screws 41 upon the plane surface 35. The housing 40 provides a box-like structure which receives a contact carrier 42 made of Bakelite or other plastic insulating material. Carrier 42 provides a recess for receiving a contact member 43 provided with contact projections 44 for engaging stationary contact members 45 which are inserted in a non-conducting cover 46. The inserts 45 provide terminal plugs 47 for engaging sockets mounted on the ends of wires, not shown. The cover 46 is held in position by tangs 48 provided by the switch case 40 which are deformed into notches 49 provided by cover 46. The carrier 42 provides pockets 50 for receiving tangs 51 of contact member 43. Carrier 42 drives member 43 thru the tangs 51. A spring 52 received by pocket in the carrier 42 urges the contact buttons 44 against the inner surface of the cover 46.

The carrier 42 is provided on its under side with a notch 55 which receives an actuator 56 having a protruding flange 57 engaged by the right-hand end of carrier 42 and having a downwardly turned flange 58 extending thru a slot 59 in the bottom of the case 40. Flange 58 carries a stud 60 which projects thru a notch 61 in washer 27 and engages the piston member 23. The carrier 42 is urged toward the right by a pair of springs 62, Fig. 6, which are received by pockets 63 in carrier 42 and which are retained in said pockets by the cover 46. The springs 62 urge the carrier 42 against the flange 57 of plate 56 and consequently urge the stud 60 against the piston 23 against the action of spring 26 which is much stronger than springs 62. Therefore, normally these springs 62 are held in the compressed state shown in Fig. 6 and the contact buttons 44 are out of engagement with stationary switch contacts 45.

When the brakes are applied the piston 23 is moved toward the right by the pedal operated rod 31, from the position shown in Fig. 1. During this movement the switch contact 43 is moved toward the right under the action of the springs 62 to cause the buttons 44 to engage the contacts 45 thereby completing a circuit between a storage battery and a stop light. When the pedal operated rod 31 is released, the spring 26 expands to move the piston 23 toward the left into engagement with the washer 27. During this movement of the piston 23 the stud 60 is moved toward the left thereby moving contact member 43 into the position shown in Figs. 6 and 7 against the action of springs 62 which are very much weaker than spring 26 which restores the piston 23.

In order that the washer 27 may be in such position that its notch 61 will receive the stud 60 of the switch, said washer is provided with a tang 27a received by a notch 28a provided by the casting 20.

In order to prevent ingress of dirt and water to the master brake cylinder and to protect the connection between the rod 31 and the piston 23 and in order to protect the switch, I provide a flexible rubber boot 70 having a neck 71 thru which the rod 31 extends and having a flange or bead 72 which stretched will encompass the casting 20 and the switch, as shown in Figs. 1 and 2.

While the embodiment of the present invention as herein disclosed, constitutes a preferred form, it is to be understood that other forms might be adopted, all coming within the scope of the claims which follow.

What is claimed is as follows:

1. In a master brake cylinder and stop-light switch unit comprising a plurality of sub-assemblies one of which includes a cylinder member having a notch formed in one end, a piston movable within the cylinder, yieldable means for urging the piston in one direction, and a washer removably secured to the cylinder member for limiting the movement of the piston in one direction, said washer having a through slot formed therein and having a projection for registry with the notch to prevent the washer from turning relative to the cylinder member; and a switch sub-assembly mounted upon the end portion of the cylinder said switch including an actuator movable longitudinally of the cylinder and projecting through the slot of the washer and extending into the cylinder against the piston whereby as a result of the movement of the piston in one direction away from its normal position the actuator is effected to close the switch.

2. In a master brake cylinder and stop-light switch unit comprising a plurality of sub-assemblies one of which includes a cylinder member having a notch formed in one end, a piston movable with in the cylinder, yieldable means for urging the piston in one direction, a headed rod manually operated for moving the piston in the opposite direction against the action of the yieldable means; and a washer loosely assembled with the rod to permit movement of the rod relative to the washer; means for detachably securing the washer to the cylinder whereby the movement of the rod and piston is limited in said one direction, said washer having a through slot formed therein and having a projection for registry with the notch to prevent the washer from turning relative to the cylinder member; and a switch sub-assembly mounted upon the end portion of the cylinder, said switch including an actuator movable longitudinally of the cylinder and projecting through the slot of the washer and extending into the cylinder against the piston whereby as a result of the movement of the piston by the rod the actuator is effected to close the switch.

ARNOLD A. BLUEMLE.